UNITED STATES PATENT OFFICE.

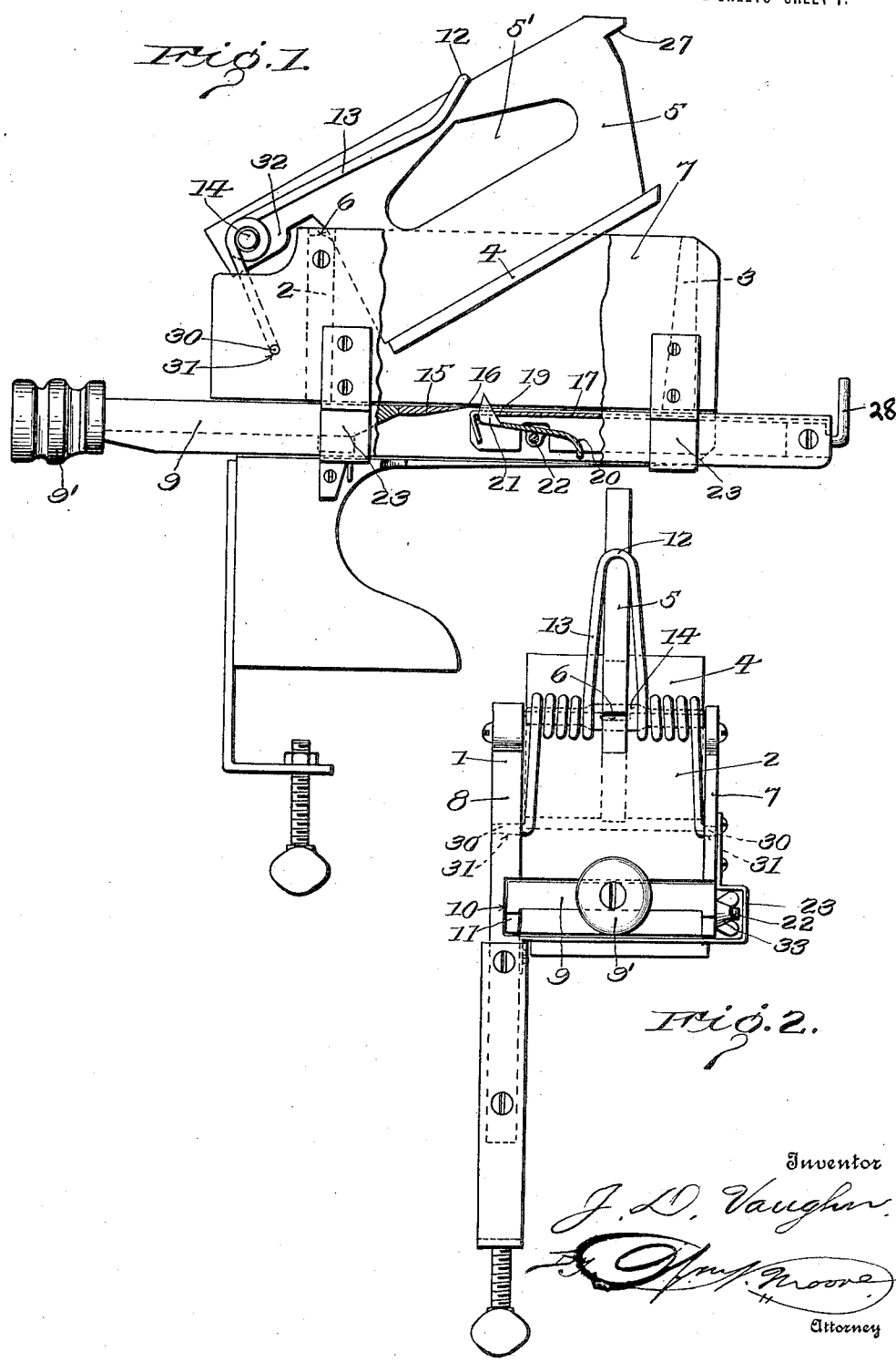

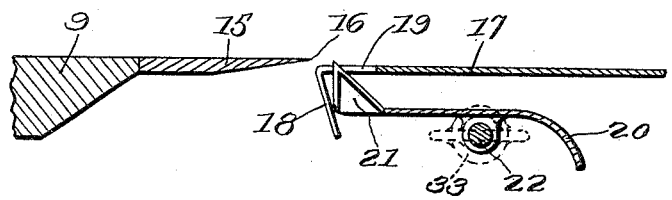
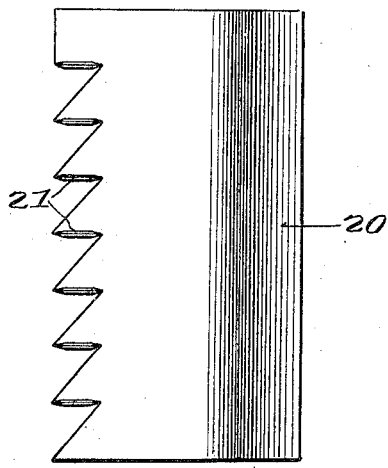
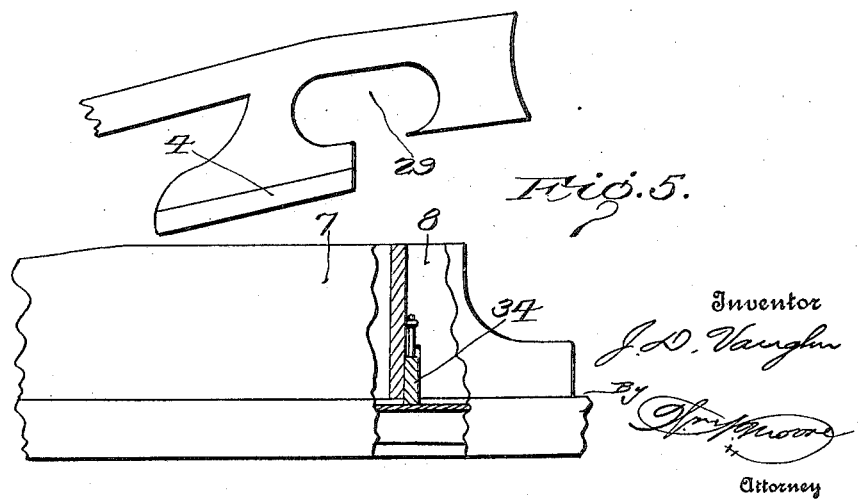

JOSEPH DANIEL VAUGHN, OF SALT LAKE CITY, UTAH.

SLICING-MACHINE.

1,397,469.  Specification of Letters Patent.  Patented Nov. 15, 1921.

Application filed October 29, 1919. Serial No. 334,146.

*To all whom it may concern:*

Be it known that I, JOSEPH D. VAUGHN, a citizen of the United States, residing at Salt Lake City, in the county of Salt Lake and State of Utah, have invented certain new and useful Improvements in Slicing-Machines, of which the following is a specification.

This invention has reference to slicing or shredding devices of the kind employed in preparing potatoes, cabbage, and other kinds of vegetables or the like or cheese or meat or other kinds of foods for the table or for cooking purposes, and it is one of the important objects of my invention to arrange the knives or other comminuting devices in such a manner that they are not likely to hurt the operator during the manipulation of the device. A further object of my invention is the provision of means whereby the size of the slices or other reduced articles and the shape of such particles may be easily adjusted, and I also provide improved means of automatically feeding the material to be operated upon to the knives in a very simple and effective manner. Other objects and advantages of my invention will appear from the specification thereof and from the accompanying sheet of drawing.

In the drawing I have represented by way of example preferred means of embodiment of the principles of my invention, Figure 1 showing a device of the kind referred to in part elevation part longitudinal section.

Fig. 2 is a front end view of the device.

Fig. 3 is a longitudinal sectional view of the operating knives.

Fig. 4 is a detail showing one of the operating knives in plan view.

Fig. 5 is a fractional sectional view of a somewhat modified form of construction.

In the drawings: 1 indicates broadly a substantially rectangular, box shaped container for the material to be operated upon and being here shown as provided with front and rear walls 2 and 3 respectively, and side walls 7, 8. A cover 4 is pivotally secured between the side walls in such a manner that, when fully opened, it will perfectly uncover and expose the interior of the box 1, and remain in an upright or substantially vertical or nearly vertical position, while, when perfectly closed, the said cover will be substantially coextensive and substantially in contact with the sliding bottom of said box 1 which I shall presently describe. Of the various means by which this object may be attained I have shown on the accompanying drawing what I consider a most simple way of accomplishing the object desired in a preferred form of construction in which the said cover 4 is secured to a vertical web or rib or similar member 5 which at one end is extended beyond the front wall 2, the said projecting end being securely mounted upon a rod or bar 14. One or more springs 13 are mounted upon said rod or bar 14 the free ends of said spring or springs entering holes in the side walls 7, 8 of the box 1. The other adjacent ends of the springs are caused to bear upon the rib 5 of the cover 4. Or in the case of using but one spring 13, as shown in the drawing, a loop 12 is formed on the spring 13 intermediate the convolutions surrounding the rod 14, the said loop bearing against the rib 5. The free ends 30 of the spring are removably mounted in the pivoting holes 31 provided in the frontwise extensions of the side walls 30, 31. It appears therefrom that the arms 30 of the spring or springs constitute the radii of a circle relatively to which the loop 12 or the outer edge of the rib 5 are substantially tangentially arranged so as to result in a hatchet-like or similar movement of the cover 4 by means of which the outermost part of the cover is moving gradually but with great and constantly increasing force and with a downwardly and backwardly pushing movement toward the material which has been deposited or spread out on the bottom, thereby both compressing said material and forcing it gradually and steadily toward the front end of the device.

A notch 6 is arranged at the top part of the front wall 2 to serve as a guide for the handle-shaped forwardly extended part 32 of the rib 5 which is secured to the rod 14. A stop 27 may be provided at the upper rear end of the rib 5 to engage with the top part of wall 3. 5' is an opening in the rib 5 for the manipulation of the same. The free ends of the rib 5 and of the cover 4 as well as the adjacent side of the rear wall 3 are preferably somewhat beveled toward the inside of the box 1 to allow of a smooth circular movement of the cover 4.

9 is the sliding bottom of the box 1, and provided with a handle or the like 9'. The bottom projects for a rather considerable distance at both ends beyond the side walls of the box 1. It may be provided with guide ribs 11 or similar means to guide it in grooves 10 of the side walls of the box 1. In the preferred form of construction shown in the drawing one of the side walls 7 is of less height than the other side wall 8, downwardly projecting ears or the like 23 of metal or equivalent material being provided at the side wall 7 to complete the guiding of the bottom 9. This construction provides for the possibility of removing the slidable bottom by turning down the stop at the far end of the sliding bottom sidewise after detaching the ears 23, so that the bottom and the knives mounted therein may be easily cleaned from remnants of vegetables or the like accumulating thereon. The construction referred to also provides for the possibility of lateral expansion of the bottom so that the slidable bottom will not stick or become pinched and retained in the guideways as it would be likely to be if the groove 10 would be duplicated on the side wall 7.

The cutting or slicing knives or the like 15, 16, 17 are provided in the slidable bottom 9. 15 is the stationary knife having the cutting edge 16, and coöperating with an adjustable gage plate 17 which may be set at any suitable distance from the knife edge 16. The confronting edge of the gage plate 17 is preferably downwardly bent or curved at 18, so as to serve as guide for the chips delivered through the slot between the knives, and serving also as a protection for a supplementary knife 20, here shown as being arranged underneath the gage plate 17, and being longitudinally movable and adjustable both longitudinally as well as pivotally upon one or more rods 22 between which and the gage plate 17 the said knife 20, 21 is arranged. A wing nut 33 on said rod 22 serves to tightly draw the side wall 11 of the slidable bottom against the knife 20, 21 so as to lock the same in position.

The supplemental knife or slicer 21, 22 which is mounted for coöperation with the other knives by the arrangement of the slidable bottom, and of the box hereinbefore described is preferably provided with a serrated front edge presenting upwardly directed teeth 21. These teeth are arranged so as to be adapted to be projected through slots 19 in the front part of the gage plate 17. At its other end the knife 20, 21 is preferably downwardly curved or bent or provided with a stop to limit its movement along the guiding and tightening rod 22. By causing the teeth 21 to project through the slots 19 potatoes, beets or other vegetables or kinds of food may be cut into longitudinal strips divided by the transverse cut between the knife 16 and the plate 17. The construction referred to is particularly desirable in cutting potatoes for so-called "French fried potatoes" or for similar culinary and other purposes. A stop 28 is provided at the rear end of the slidable bottom.

In the modified form of construction shown in Fig. 5 a vertical slide 34 is provided between the side walls 7, 8 of the box and near the rear part thereof which is depressed by the downward movement of the cover 4 which in this modification is shown as being provided with a recessed or throat-shaped part 29 which may serve both as a handle and as a means to engage with the vertical slide 34. This slide 34 is gradually depressed forcing the last piece of material in the box toward the knives.

It is to be understood that my invention is not limited to the particular form of construction shown by way of illustration on the drawing, but it is capable of various changes and modifications to adapt the device to the particular material operated upon, or according to the convenience of the user. The form and position of the knives may be changed, and various means may be employed for the operation of the swinging cover or of the slidable bottom, and other changes in the construction and arrangement of parts may be effected without deviating from the spirit of my invention as expressed in the claim.

What I claim is:—

In a slicing, chipping and comminuting device, a container, a cover therefor, a sliding bottom in said container, a stationary knife secured in said bottom, an adjustable knife carried by said bottom and properly spaced from said stationary knife, said adjustable knife being formed with slots and with a contiguous downward bent portion forming a guide, a rod mounted below said adjustable knife and a supplemental knife mounted upon said rod and having its cutting teeth projecting up through the slots of said adjustable knife.

In testimony whereof I affix my signature.

JOSEPH DANIEL VAUGHN.